United States Patent
Zhang et al.

(10) Patent No.: US 9,672,621 B2
(45) Date of Patent: Jun. 6, 2017

(54) METHODS AND SYSTEMS FOR HAIR TRANSPLANTATION USING TIME CONSTRAINED IMAGE PROCESSING

(71) Applicant: Restoration Robotics, Inc., San Jose, CA (US)

(72) Inventors: Hui Zhang, San Jose, CA (US); (Radhika) Mohan Bodduluri, Palo Alto, CA (US)

(73) Assignee: Restoration Robotics, Inc., San Jose, CA (US)

( * ) Notice: Subject to any disclaimer, the term of this patent is extended or adjusted under 35 U.S.C. 154(b) by 48 days.

(21) Appl. No.: 14/920,550

(22) Filed: Oct. 22, 2015

(65) Prior Publication Data
US 2016/0042512 A1 Feb. 11, 2016

Related U.S. Application Data

(62) Division of application No. 13/800,981, filed on Mar. 13, 2013, now Pat. No. 9,202,276.

(51) Int. Cl.
*G06K 9/00* (2006.01)
*G06T 7/00* (2017.01)

(52) U.S. Cl.
CPC .......... *G06T 7/0014* (2013.01); *G06T 7/0016* (2013.01); *G06T 2207/20021* (2013.01); *G06T 2207/30088* (2013.01); *G06T 2210/41* (2013.01)

(58) Field of Classification Search
None
See application file for complete search history.

(56) References Cited

U.S. PATENT DOCUMENTS

| 5,901,199 | A | 5/1999 | Murphy et al. |
| 6,654,507 | B2 | 11/2003 | Luo |
| 7,277,120 | B2 | 10/2007 | Gere et al. |
| 7,627,157 | B2 * | 12/2009 | Qureshi ............. G06K 9/00127 382/128 |
| 7,760,968 | B2 | 7/2010 | Ruggiero |
| 7,962,192 | B2 * | 6/2011 | Bodduluri ........ A61B 17/32053 600/407 |

(Continued)

FOREIGN PATENT DOCUMENTS

WO  WO 03/044737  5/2003

OTHER PUBLICATIONS

Ko, et al., "Fast Digital Image Stabilizer Based on Gray-Coded Bit-Plane Matching", Consumer Electronics, ICCE International Conference on Jun. 22-24, 1999, Jun. 1999, pp. 90-91.

(Continued)

Primary Examiner — Tahmina Ansari
(74) Attorney, Agent, or Firm — Lena I. Vinitskaya

(57) ABSTRACT

Methods and systems are described for hair transplantation and other surgical procedures on a body surface. Specifically, methods and systems for computer-implemented and/or robotic hair transplantation and other surgical procedures, using time constrained image processing techniques are described. In various examples, multiple images of a body surface may be divided into overlapping sub regions for comparison. In various other cases, a percentage of an image of a body surface to be processed may be adjusted based on a time constraint. In some implementations, the output of one of these methods may be used as input for the other method.

21 Claims, 15 Drawing Sheets

(56) References Cited

U.S. PATENT DOCUMENTS

| | | | |
|---|---|---|---|
| 8,811,660 B2* | 8/2014 | Qureshi | G06T 7/248 382/103 |
| 2005/0119783 A1 | 6/2005 | Brisson et al. | |
| 2007/0150247 A1* | 6/2007 | Bodduluri | G06F 19/3437 703/11 |
| 2009/0080733 A1* | 3/2009 | Qureshi | G06K 9/00127 382/128 |
| 2010/0080417 A1* | 4/2010 | Qureshi | G06T 7/248 382/103 |
| 2011/0293175 A1* | 12/2011 | Yoon | H04N 5/23238 382/165 |
| 2012/0179189 A1 | 7/2012 | Zingaretti et al. | |
| 2014/0270422 A1* | 9/2014 | Zhang | G06T 7/0014 382/128 |

OTHER PUBLICATIONS

Konolige, et al., "SRI Small Vision System", SRI International—User's Manual Software Version 3.2g, Nov. 2004, (86 pages).

Sun, "Fast Stereo Matching Using Rectangular Subregioning and 3D Maximum-Surface Techniques", International Journal of Computer Vision 47 (1/2/3), 2002, 99-117.

Woodfill, et al., "Tyzx DeepSea High Speed Stereo Vision System", Proceedings of the IEEE Computer Society Workshop on Real Time 3-D Sensors and Their Use, Conference on Computer Vision and Pattern Recognition, (Washington, D.C.), Jun. 2004, 5 pages.

* cited by examiner $$T_{total} = \sum t_i = \sum_{i=0}^{N} a_i * ratio^i$$

$$t_i = a_i * ratio^i$$

FIG. 7A $$a_i = \frac{t_i}{ratio^i}$$

$$\bar{a} = \frac{\sum a_i}{K}$$

FIG. 7B $$T = \begin{bmatrix} T_{total}(0) \\ \vdots \\ T_{total}(M-1) \end{bmatrix} = \begin{bmatrix} a_0 * (ratio(0))^0 + \cdots + a_N * (ratio(0))^N \\ \vdots \\ a_0 * (ratio(M-1))^0 + \cdots + a_N * (ratio(M-1))^N \end{bmatrix}$$

$$= \begin{bmatrix} (ratio(0))^0 & \cdots & (ratio(0))^N \\ \vdots & \ddots & \vdots \\ (ratio(M-1))^0 & \cdots & (ratio(M-1))^N \end{bmatrix} \cdot \begin{bmatrix} a_0 \\ \vdots \\ a_N \end{bmatrix} = R \cdot A$$

$$A = (R^t \cdot R)^{-1} \cdot R^t \cdot T$$

FIG. 7C

METHODS AND SYSTEMS FOR HAIR TRANSPLANTATION USING TIME CONSTRAINED IMAGE PROCESSING

RELATED APPLICATION DATA

The present application is a divisional of co-pending U.S. application Ser. No. 13/800,981 filed Mar. 13, 2013, and entitled "Methods and Systems for Hair Transplantation Using Time Constrained Image Processing".

TECHNICAL FIELD

This disclosure relates generally to methods and systems for facilitating hair transplantation and other surgical procedures on body surfaces. More specifically, the disclosure relates to methods and systems for hair transplantation and other surgical procedures using real-time image guidance and time constrained image processing.

BACKGROUND

In a number of automated, computer-assisted and/or robotic surgical operations performed on a surface of a body, such as hair transplantation surgery, image-guidance is used to guide one or more surgical tools to perform a given procedure. Such image guidance typically relies on computing devices to process images used to guide the surgical tools. For example, one or more computing devices may process one or more images in order to track objects and/or positions of objects as part of the hair transplantation or other surgical process. By way of another example, one or more computing devices may process one or more images to identify facial and/or other features of persons or other creatures present in the images. In such processing, the computing device or devices may perform a variety of operations such as modeling and analyzing the image(s), comparing images, and/or various other operations.

In many cases of image-guided surgical procedures on body surfaces, computing devices used for the procedures may process images under one or more time constraints. For example, computing devices may process images in a sequential series, such as frames of one or more videos. In such situations, a computing device may need to finish processing one or more received frames before subsequent frames are received in order to avoid dropping frames. By way of another example, image processing performed for automated and/or computer-assisted surgical operations may need to be completed within time constraints in order to prevent surgical errors due to patient movement, lag in guidance or machine direction, and/or other such potential problems.

BRIEF SUMMARY

The present disclosure discloses systems, methods, and computer program products for time constrained image processing especially useful in hair transplantation and other medical applications. According to one aspect of the present disclosure, a method, system, and computer program product for improving performance of tracking and/or pairing of features of interest from different frames and/or cameras are provided. The method allows improved finding of a logical connection of features of interest (for example, hair) between different frames using sub-region processing. In some embodiments, a first and second image of a body surface may be divided into a number of overlapping sub regions. Each of the overlapping sub regions of the first image may correspond to one of the overlapping sub regions of the second image. Subsequently, at least one of the sub regions of the first image may be compared to a corresponding sub region and/or several sub regions in close proximity to the original corresponding sub region of the second image. In some embodiments, each of the sub regions of the first image may be compared to a corresponding sub region and/or several sub regions in close proximity to the original corresponding sub region of the second image. The comparison may include searching a sub region of the second image for a corresponding feature to a feature of the first image wherein the sub region of the second image corresponds to the primary sub region for the feature. If the corresponding feature is not found in the primary sub region of the second image, at least one additional sub region of the second image may be searched for the corresponding feature. The at least one additional sub region is one that is classified as secondary for the feature. In this way, by dividing the whole image into different overlapping small sub regions and searching for features of interest within such sub-regions as described herein, processing of the first and second images is performed in less time than if the entirety of the first and second images were compared.

In some embodiments, the method may include for one or more of the plurality of features in the first image of the body surface, determining a group of the first plurality of overlapping sub regions that includes the respective feature, wherein the plurality of features includes the feature; for one or more features of the plurality of features in the first image of the body surface, classifying one of the group of the first plurality of overlapping sub regions as the primary sub region for the respective feature; and for one or more features of the plurality of features in the first image of the body surface, classifying at least one of the group of the first plurality of overlapping sub regions as secondary for the respective feature, wherein each of the group of the first plurality of overlapping sub regions is classified as secondary when the respective sub region is not the primary sub region. A sub region of the first plurality of overlapping sub regions is the primary sub region for the respective feature when the respective feature is closer to a center of the sub region than a center of any other sub region of the first plurality of overlapping sub regions.

In various embodiments, the comparison may be performed to track a positional difference for the feature between the first image of the body surface and the second image of the body surface. In other embodiments, the comparison may be performed to pair the feature with the corresponding feature to determine at least one connection between the first image of the body surface and the second image of the body surface. The feature may be paired with the corresponding feature when a difference between a location of the feature in the first image of the body surface is within at least one-dimensional constraint of a location of the corresponding feature in the second image of the body surface.

In one or more embodiments, for example when the first and second images are taken by different cameras (a first and a second cameras) at substantially the same time (e.g., stereo imaging), and the third and fourth image are from the first and the second cameras taken at a subsequent time, the method may further include determining an average dimensional shift for at least one of the first plurality of overlapping sub regions by averaging dimensional shifts between locations of one or more of the plurality of features in the first image of the body surface and locations of corresponding features in the second image of the body surface. The method may further include dividing a third image of the body surface into a third plurality of overlapping sub regions; dividing a fourth image of the body surface into a fourth plurality of overlapping sub regions, wherein each of the third plurality of overlapping sub regions corresponds to one of the fourth plurality of overlapping sub regions; and pairing a feature of the third image of the body surface located in a sub region of the third plurality of overlapping sub regions corresponding to the at least one of the first plurality of overlapping sub regions with a corresponding feature of the fourth image of the body surface, wherein the feature of the third image of the body surface is paired with the corresponding feature of the fourth image of the body surface when a difference between a location of the feature in the third image of the body surface is within a value of a location of the corresponding feature in the fourth image of the body surface, the value being a difference between the at least one dimensional constraint and the average dimensional shift for the at least one of the first plurality of overlapping sub regions.

In some embodiments, the method may further include determining a group of features in the first image of the body surface and analyzing the group of features to determine which features of the group of features are features of interest, wherein the plurality of features in the first image of the body surface are determined to be the features of interest. The group of features may be a group of blobs, and the features of interest may be, for example, hair follicles or follicular units.

In various embodiments, the method may comprise positioning a tool for hair transplantation on the body surface based on results of processing at least the first image of the body surface and the second image of the body surface.

In one or more embodiments, at least one user instruction may be received specifying how to divide the first image of the body surface. The first image of the body surface may be divided into a first plurality of overlapping sub regions according to the user instruction.

In some embodiments, the first image of the body surface and the second image of the body surface may be part of a sequence of images of the body surface, including those taken by the same imaging device, such as camera. The first image of the body surface and the second image of the body surface may be images of a same scene captured by different cameras. In some embodiments, each of the first plurality of overlapping sub regions may overlap at least a portion of four other sub regions of the first plurality of overlapping sub regions. In some embodiments, each of the first plurality of overlapping sub regions may overlap at least ten percent of at least one other sub region of the first plurality of overlapping sub regions.

In various embodiments, dividing the first image of the body surface may include dividing the first image of the body surface into a first group of sub regions, wherein sub regions of the first group do not overlap and dividing the first image of the body surface into a second group of sub regions wherein each of the second group of sub regions cover at least one border between at least a first sub region of the first group of sub regions and a second sub region of the first group of sub regions.

In one or more embodiments, the first image of the body surface may be a first selection from a first larger image of the body surface and the second image of the body surface may be a second selection from a second larger image of the body surface.

In some embodiments, all of the first plurality of overlapping sub regions may have uniform dimensions.

According to another aspect described in the present application, systems and methods for image processing may include dividing a first image of the body surface into a first plurality of overlapping sub regions, wherein all of the first plurality of overlapping sub regions have uniform dimensions; dividing a second image into a second plurality of overlapping sub regions, wherein each of the first plurality of overlapping sub regions corresponds to one of the second plurality of overlapping sub regions; and comparing each of the first plurality of overlapping sub regions to the corresponding one of the second plurality of overlapping sub regions.

According to a further aspect of the application, a computer program product for processing images of a body surface as part of a hair transplantation or other medical procedure is provided, the computer program product comprising: a first set of instructions, stored in at least one non-transitory machine readable medium, executable by at least one processing unit, to divide a first image of the body surface into a first plurality of overlapping sub regions; a second set of instructions, stored in the at least one non-transitory machine readable medium, executable by the at least one or a different processing unit, to divide a second image of the body surface into a second plurality of overlapping sub regions, wherein at least one of the first plurality of overlapping sub regions corresponds to one of the second plurality of overlapping sub regions; and a third set of instructions, stored in the at least one non-transitory machine readable medium, executable by the at least one or a different processing unit, to compare at least one sub region of the first plurality of overlapping sub regions with a corresponding one of the second plurality of overlapping sub regions by: searching a primary sub region of the second plurality of overlapping sub regions for a corresponding feature that corresponds to a feature of the first image of the body; and if the corresponding feature is not found in the primary sub region of the second plurality of overlapping sub regions, searching at least one additional sub region of the second plurality of overlapping sub regions for the corresponding feature, wherein the at least one additional sub region of the second plurality of overlapping sub regions is classified as secondary for the feature.

According to further features of the systems and methods of the present application, a portion of an image of a body surface to be processed may be automatically sized to improve processing time or to fit a timing requirement for processing based on the information in the image of the body surface. In some embodiments, a processing window corresponding to a portion of an image of a body surface is chosen and an amount of time required to process the processing window may be estimated. The dimensions of the processing window may be adjusted when the estimated amount of time is less than or greater than a time constraint. If adjustment is required, the adjusted portion of the image corresponding to the dimensions of the adjusted processing window may then be processed. In this way, the processing of the image of the body surface may be adjusted to process as much of the image as is possible within the time constraint.

In certain embodiments, systems and methods for image processing may include estimating an amount of time required to process a percentage of an image of the body surface; setting dimensions of a processing window to correspond to the percentage of the image of the body surface; increasing the dimensions of the processing window when the estimated amount of time is less than a time constraint; decreasing the dimensions of the processing window when the estimated amount of time is greater than the time constraint; and processing a portion of the image of the body surface corresponding to the dimensions of the processing window.

In some embodiments, the image of the body surface may be a frame of video of the body surface and estimating may include determining a difference between a previous estimation of an amount of time required to process a portion of at least one previous frame of the video of the body surface and an actual amount of time spent processing the portion of the at least one previous frame; and modifying the estimated amount of time based at least on the difference.

In various embodiments, estimating may further include generating at least one model to determine the estimated amount of time required to process, for example, the percentage of the image of the body surface. The at least one model may be at least one of an average coefficients model or a least square fitting model.

In one or more embodiments, the image of the body surface may be a frame of a video of the body surface and the method may further include determining a difference between a previous estimation of an amount of time required to process a portion of at least one previous frame of the video of the body surface and an actual amount of time spent processing the portion of the at least one previous frame and updating the at least one model based at least on the difference.

In some embodiments, adjustment may be omitted when the estimated amount of time is equal to the time constraint.

In some embodiments, at least one automated operation or procedure may be performed (e.g., automated positioning of the hair harvesting or hair implantation tool relative to the hair on the body surface) based at least on a result of the processing step.

In various embodiments, the processing window may be centered with respect to the image of the body surface.

In some embodiments, at least one reconstruction of at least one scene captured by at least a part of the image of the body surface may be generated based at least in part on the processing step. The generation of the at least one reconstruction may be based on the processing step and at least one selected region of the image. The at least one selected region may be selected based on a density of features within that region. The features may be follicular units. At least a portion of the at least one selected region may be outside the portion of the image of the body surface corresponding to the dimensions of the processing window.

In various embodiments, the method may further include transmitting at least one first instruction to at least one imaging device that captures the images to be processed to increase a frame rate of the at least one imaging device when the estimated amount of time is less than the time constraint or transmitting at least one second instruction to the at least one imaging device to decrease a frame rate of the at least one imaging device when the estimated amount of time is greater than the time constraint.

In one or more embodiments, the image of the body surface may be a frame of a video of the body surface and the method may further include transmitting at least one instruction to at least one imaging device to decrease a frame rate of the at least one imaging device when the estimated amount of time is greater than the time constraint and more than a threshold number of previous frames have been lost.

In some embodiments, method may include processing the portion of the image of the body surface to position a tool, for example, a tool for transplanting hair, on a body surface.

In various embodiments, the methodology for adjusting the size of a portion of an image of a body surface to improve processing time may be combined with the methodology for dividing the image into a plurality of the overlapping sub regions to improve processing time.

In one or more embodiments, adjusting may include increasing the dimensions of the processing window when the estimated amount of time is less than a time constraint and decreasing the dimensions of the processing window when the estimated amount of time is greater than the time constraint.

In some embodiments, estimating may estimate the amount of time required to process the percentage of the image of the body surface based on a density of features, for example, hair follicles, within the percentage of the image of the body surface.

In another aspect of the application, a computer program product for processing an image of a body surface is provided. The computer program comprising: a first set of instructions, stored in at least one non-transitory machine readable medium, executable by at least one processing unit to choose a processing window corresponding to a portion of an image of a body surface; a second set of instructions, stored in the at least one non-transitory machine readable medium, executable by the at least one or a different processing unit to estimate an amount of time required to process the processing window; a third set of instructions, stored in the at least one non-transitory machine readable medium, executable by the at least one or a different processing unit to adjust the dimensions of the processing window when the estimated amount of time is less than or greater than a time constraint; and a fourth set of instructions, stored in the at least one non-transitory machine readable medium, executable by the at least one or a different processing unit to process either the portion of the image if no adjustment to the processing window is made or an adjusted portion of the image of the body surface corresponding to the adjusted dimensions of the processing window.

In various implementations of the methods of the present application, the first and second image and/or the image may be one or more images of a patient's body surface, for example, scalp. In such implementations, the discussed comparison and/or processing may be performed to improve efficiency, accuracy and speed of tracking and pairing follicular units in order to correctly and quickly position and/or orient a tool, such as a tool for transplanting follicular units, relative to such follicular units. However, it is understood that this is an example and the present disclosure is not intended to be limited to images of a patient's scalp and/or orienting a tool for transplanting follicular units.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 7A illustrates a formula that represents the processing time for a portion of an image.

FIG. 7B illustrates a first formula for approximating the coefficients for building and/or updating the model illustrated in FIG. 7A.

FIG. 7C illustrates a second formula for approximating the coefficients for building and/or updating the model illustrated in FIG. 7A.

DETAILED DESCRIPTION

Figure 1:
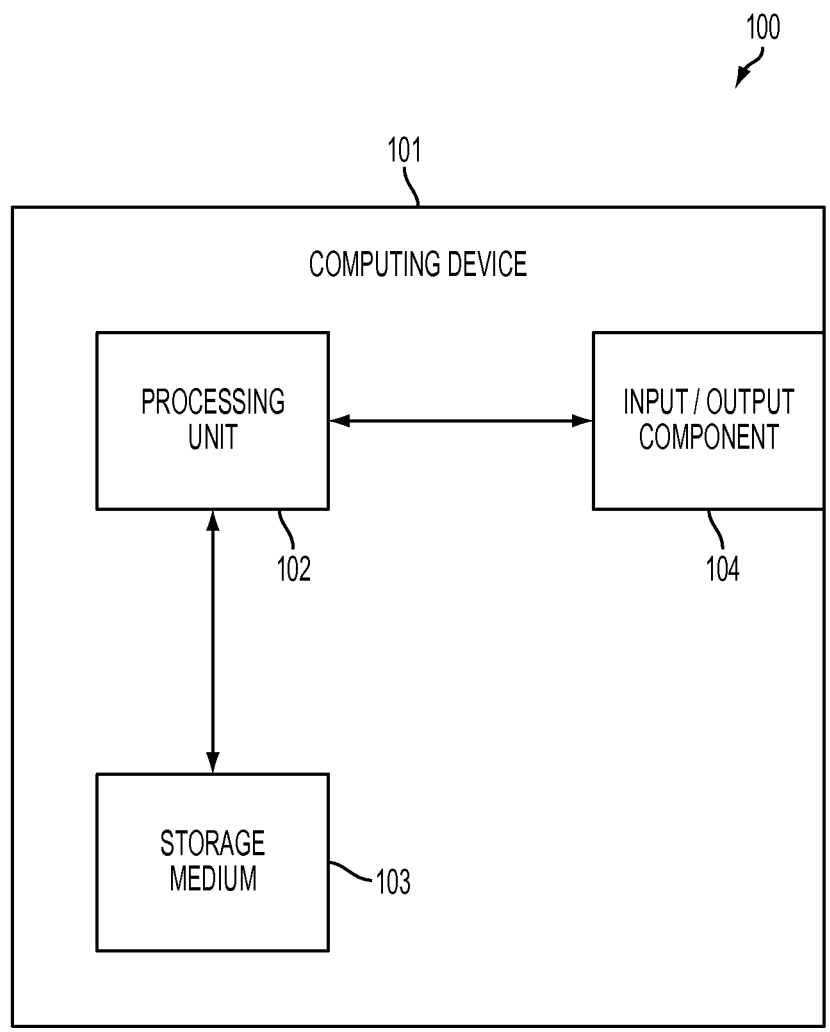
FIG. 1 is a block diagram illustrating an example system which may perform one or more methods of image processing in accordance with the present disclosure.

The description that follows includes sample systems, methods, and computer program products that embody various elements of the present disclosure. However, it should be understood that the described disclosure may be practiced in a variety of forms in addition to those described herein.

In the following Detailed Description, reference is made to the accompanying drawings that show by way of illustration some exemplary embodiments in which the disclosure may be practiced. In this regard, directional terminology, such as "top," "bottom," "front," "back," "distal," "proximal," "outer," "inner," "higher," "lower," "first," "second," etc., are used with reference to the orientation of the Figure(s) being described. Because components or embodiments of the present disclosure may be positioned in a number of different orientations, the directional terminology is used for purposes of illustration and is in no way limiting. It is to be understood that other embodiments may be used and structural or logical changes may be made without departing from the scope of the present disclosure. The following description, therefore, is not to be taken in a limiting sense, and the scope of the present disclosure is defined by the appended claims.

The adjective "automated" with reference to a system or process as a whole means that some part or all of a particular system or step in the process involves an autonomous mechanism or function; i.e., that mechanism or function does not require manual actuation. Ultimately, one or more steps in the procedure may be automated, or autonomous, with some parts requiring manual input. This definition encompasses an automated system that requires only an operator to depress an ON switch or schedule the operation, and also a system in which hand held tools are used but some mechanism of the system functions autonomously, i.e., without human input, to perform a function. Some of the automated systems described herein may also be robotically-assisted or computer/software/machine-instruction controlled. The devices and methods of the present disclosure are useful in manual procedures and systems, as well as in automated procedures and system. The tools of the present disclosure could be used with the robotically-assisted systems and procedures.

The term "tool," or "harvesting tool," or "implanting tool", as used herein in reference to hair transplantation, refers to any number of tools or end effectors that are capable of removing, dissecting or harvesting follicular units ("FUs") from a body surface, creating an implantation sites, or implanting FU into the body surface. In this sense, a body surface can be attached to the body or may be a flap of skin or body tissue removed from the body. Such tools may have many different forms and configurations. In many embodiments, the tool may be a hollow tubular shaft and thus may be labeled, for example, a cannula, a needle, or a punch. Other tools applicable for alternative procedures that could benefit from the disclosures of the present application may include, for example, lasers, or tattoo removal tools, surgical instruments, electrosurgical or ablation tools, eye instruments, or drills. The terms "operatively connected," "coupled," or "mounted," or "attached" as used herein, means directly or indirectly coupled, attached, or mounted through one or more intervening components.

As mentioned above, though the disclosure may be particularly useful in hair harvesting, treatment planning, and implantation of the follicular units (FUs), it is not limited to hair transplantation. Other procedures that require a model of the patient's skin surface, including where said skin surface is assumed to have some hair, or where it is desirable to track a feature on a body, for example, to position a particular tool relative to such feature (such as an eye, mole, vein, scar) to perform a procedure, may benefit from the system and method of the disclosure described herein. One example of applicability of the disclosure is in diagnostic skin imaging for cosmetic or other medical purposes. In some applications, the disclosure may be used with a vision system designed to track hair growth over a long period of time. For example, after application of a hair growth solution, one or more individual hairs may be labelled with a fingerprint, with one part of this fingerprint being perhaps the hair's natural emergence angle. After some period of time, the one or more hairs may then be identified in an image from among the many other hairs that have grown, and evaluated for hair growth. For convenience, the following description will be discussed by example in reference to specific examples and hair transplantation. It should be noted, however, that such description is for the purposes of illustration and example only and is not intended to be exhaustive or limiting.

The present disclosure discloses systems and methods for time constrained image processing useful for improving various medical procedures, for example, hair transplantation. In hair transplantation, if the computerized image processing is used, the image processor is required to process a large number of hairs (including, for example, their location, orientation and other information) in the area of interest, such as hair donor area, or a recipient site. The processing time to carry out this step may vary from one image to another depending upon the density of follicular unit harvesting/implanting area or sites in the image. According to one disclosed methodology, a first and second image may be divided into a number of overlapping sub regions. The overlapping sub regions of the first image and/or the second image may have uniform dimensions and each the overlapping sub regions of the first image may correspond to one of the overlapping sub regions of the second image. At least some or each of the sub regions of the first image may then be compared to a corresponding overlapping sub region of the second image, as described in more detail below. In this way, processing of the first and second images may require less time than if the entirety of the first and second images were compared.

Figure 5:
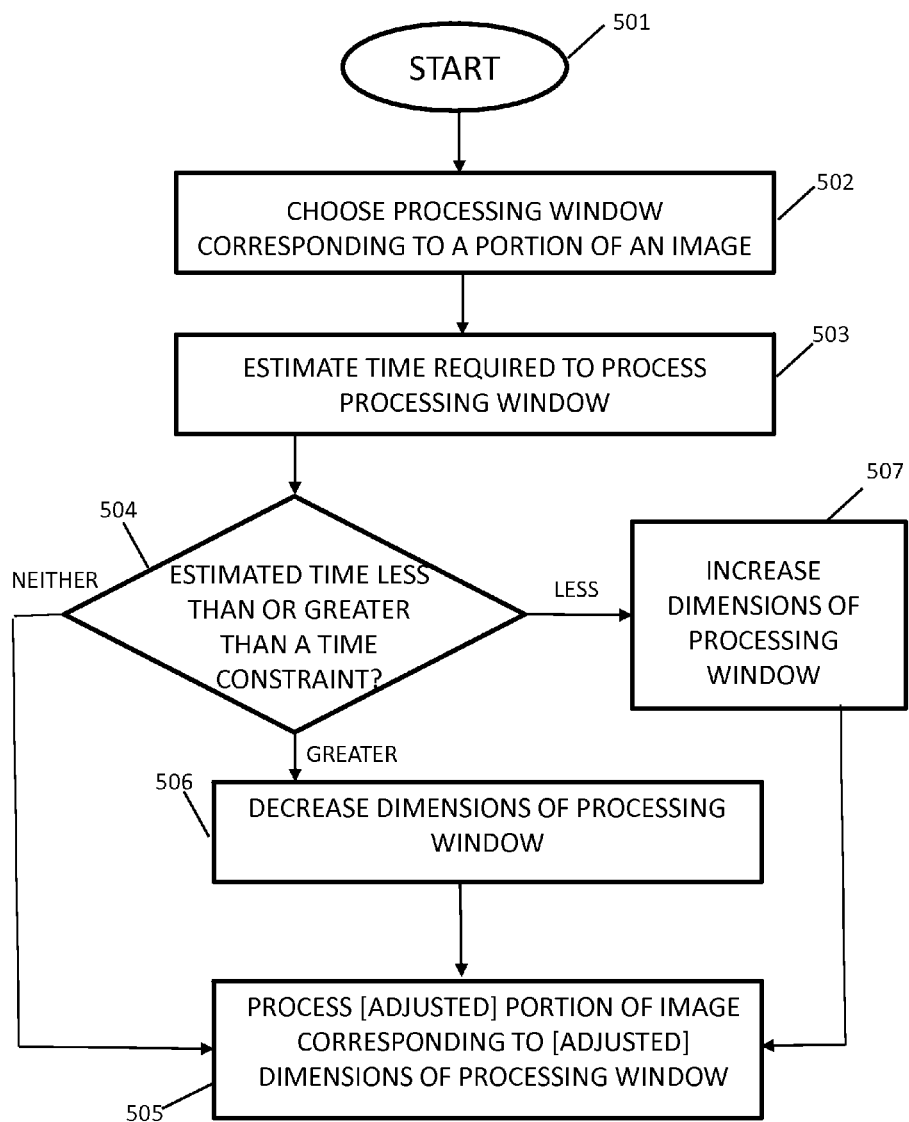
FIG. 5 illustrates another embodiment according to a different method of the present disclosure. The method may be performed by the computing device of FIG. 1.

According to another disclosed methodology described in more detail in reference to FIGS. 5-7, a portion of an image of a body surface to be processed may be sized, including automatically, to improve processing time or to fit a timing requirement for processing, for example, based on the information in the image of the body surface. Dimensions of processing window corresponding to the portion of an image may be chosen and an amount of time required for processing the processing window or the portion of the image may be estimated. If the estimated amount of time is less than a time constraint, the dimensions of the processing window may be increased. However, if the estimated amount of time is greater than the time constraint, the dimensions of the processing window may be decreased. If the estimated amount of time is about the same as the time constraint, then no adjustment is necessary and the portion of the image corresponding to the processing window may be processed. If the adjustment is required (as stated above), the adjusted portion of the image corresponding to the adjusted dimensions of the processing window may then be processed. In this way, the processing of the image may be adjusted to process as much of the image as is possible within the time constraint.

FIG. 1 is a block diagram illustrating an example system 100 which may perform one or more methods in accordance with the present disclosure. The system 100 includes a computing device 101 which may be any kind of computing device such as a desktop computer, a server computer, a laptop computer, multiple computing devices configured in a cloud computing and/or other cooperative computing arrangement, mobile computer, tablet computer, smart phone, cellular telephone, and so on.

The computing device 101 may include one or more processing units 102, one or more one or more non-transitory storage media 103 (which may take the form of, but is not limited to, a magnetic storage medium; optical storage medium; magneto-optical storage medium; read only memory; random access memory; erasable programmable memory; flash memory; and so on), and/or one or more input and/or output components 104 for transmitting output to and/or receiving input from one or more other components (such as one or more displays, keyboards, mice, track pads, track balls, styluses, printers, speakers, cameras, video cameras, and so on). The processing unit may execute instructions stored in the storage medium 103 in order to perform one or more computing device functions, such as one or more image processing methods.

Although the computing device 101 is illustrated and described as including particular components arranged in a particular configuration, it is understood that this is for the purposes of example. In various implementations, the computing device may include any number of computing device components (such as one or more busses, displays, networking components, dedicated image processors, co-processors, memories, hard drives, ports, graphics adapters, and so on) arranged in different configurations without departing from the scope of the present disclosure. For example, in one or more implementations the computing device may include multiple cameras and/or video cameras arranged to capture images and/or video of the same scene. By way of another example, in various implementations the computing device may include one or more interfaces for controlling machinery such as automated and/or computer-assisted surgical machinery.

By way of example, in reference to hair harvesting, and especially automated hair transplantation using imaging systems, blobs (e.g., hairs) are tracked and paired from different frames and/or cameras. It is important to find the logical connections of a feature of interest (for example, hairs, moles, etc.) between different frames. The frames may be from the same imaging device, such as camera, in the different time (e.g. current frame and previous frame), or from different cameras at the same time (e.g. left frame and right frame in stereo imaging). To calculate the correct connection between those frames, one feature of interest has to be compared with features of interest in the other frame, which may be a time consuming process. When performing medical procedures with the use of imaging and image processing, especially procedures involving harvesting of a large number of hair grafts, reducing processing time is of great value. In one embodiment according to the first aspect of the present disclosure, the processing unit 102 of the computing device 101 may divide a first and second image into a number of overlapping sub regions. The overlapping sub regions of the first image and/or the second image may have uniform dimensions to further improve speed and efficiency of processing. Each the overlapping sub regions of the first image may correspond to one of the overlapping sub regions of the second image. The processing unit may then compare each of the sub regions of the first image to a corresponding sub region of the second image, and/or several sub regions in close proximity to the original corresponding sub region and search for features of interest within such sub-regions. The comparison of each (or at least some) of the sub regions of the first image to a corresponding sub region of the second image and searching for features of interest may be carried out in parallel. In this way, the processing unit may require less time to process the first and second images than if the entirety of the first and second images were compared.

Although the above describes comparing sub regions, the entire sub regions may not be compared to each other. Instead, sub regions may be compared based on one or more features located in the sub regions as opposed to the entirety of each sub region.

Figure 2:
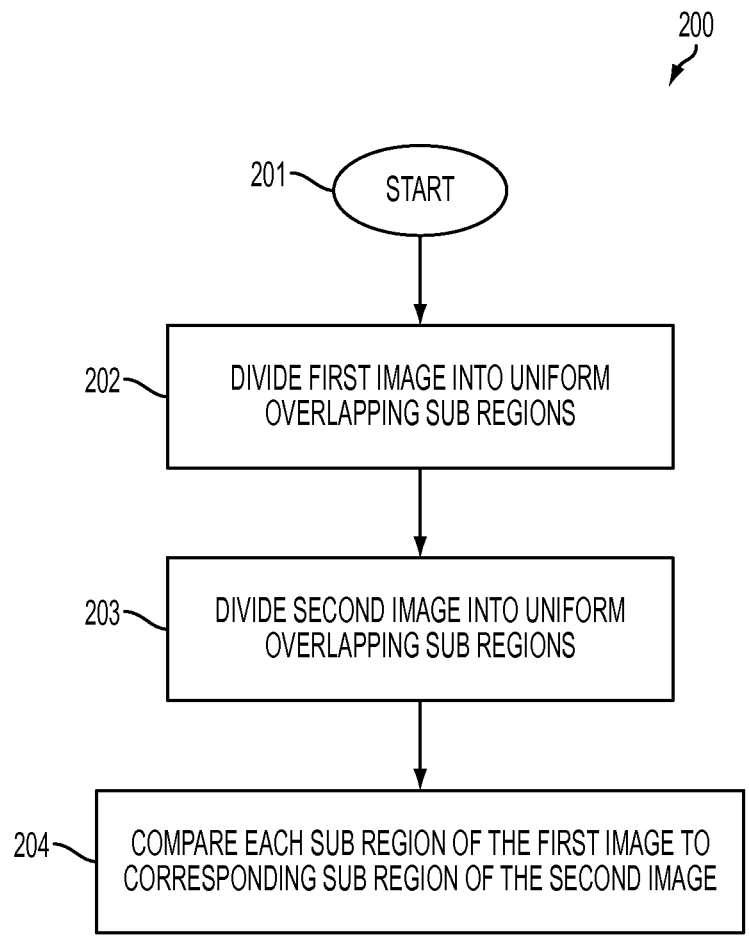
FIG. 2 illustrates an example of an embodiment according to a first method for image processing of the present disclosure. The method may be performed by the computing device of FIG. 1.

FIG. 2 illustrates one example of the embodiment of a method 200. The method 200 may be performed by the computing device 101 of FIG. 1. The flow begins at block 201 and proceeds to block 202 where a first image is divided into uniform overlapping sub regions. The flow then proceeds to block 203 where a second image is divided into uniform overlapping sub regions. Each of the uniform overlapping sub regions of the first image may correspond to one of the uniform overlapping sub regions of the second image. The flow then proceeds to block 204 where each uniform overlapping sub region of the first image is compared to a corresponding uniform overlapping sub region of the second image, and/or several sub regions in close proximity to the original corresponding sub region and search for features of interest within such sub-regions.

Although the method 200 is illustrated and described as including specific operations performed in a specific order, it is understood that this is for purposes of example. In various implementations, other operations may be performed in other orders without departing from the scope of the present disclosure. For example, in some implementations, only a portion of the first image and/or the second image may be divided into uniform overlapping sub regions and compared.

Returning to FIG. 1, the first and second images may have a variety of different relationships to each other in various different implementations. By way of a first example, the first and second images may be portions of a sequence of images, such as frames of the same video sequence. In such an example, the first and second images may be compared as part of tracking one or more objects in the first and/or second images (such as tracking one or more follicular units in a sequence of images, for example, for the purposes of positioning a tool for harvesting follicular units relative to the tracked follicular unit and/or for other purposes). For time sequential images from a single camera the first frame can provide an initial shift or motion estimation for the subsequent frames, thereby assisting with tracking the feature of interest through subsequent frames. By way of a second example, the first and second images may be images of the same scene captured by multiple cameras, such as left and right cameras. In such an example, the first and second images may be compared as part of a process of pairing the objects/features of interest (e.g. follicular units), or mathematically modeling (such as two-dimensional mathematical modeling, three-dimensional mathematical modeling, and so on) at least a portion of the scene (such as mathematically modeling a patient's body surface and follicular units in two or three dimensions), for example, for the purposes of orienting a tool for transplanting follicular units and/or for other purposes.

In one example, with reference to stereo imaging, wherein a first and a third images are taken by a first camera and a second and a fourth images are taken by a second camera, the method may comprise determining an average dimensional shift for at least one of the first plurality of overlapping sub regions by averaging dimensional shifts between locations of one or more of the plurality of features in the first image of the body surface and locations of corresponding features in the second image of the body surface. The method may also comprise dividing a third image of the body surface into a third plurality of overlapping sub regions; dividing a fourth image of the body surface into a fourth plurality of overlapping sub regions, wherein each of the third plurality of overlapping sub regions corresponds to one of the fourth plurality of overlapping sub regions. The method may further comprise pairing a feature of the third image of the body surface located in a sub region of the third plurality of overlapping sub regions corresponding to the at least one of the first plurality of overlapping sub regions with a corresponding feature of the fourth image of the body surface, wherein the feature of the third image of the body surface is paired with the corresponding feature of the fourth image of the body surface when a difference between a location of the feature in the third image of the body surface is within a value of a location of the corresponding feature in the fourth image of the body surface, the value being a difference between the at least one dimensional constraint and the average dimensional shift for the at least one of the first plurality of overlapping sub regions.

The first and/or second regions may be divided into overlapping sub regions according to a number of different methodologies in a number of different implementations. In some embodiments, to further improve the speed of the process, the image may be divided into uniform overlapping sub regions. In some cases, dividing the first image into uniform overlapping sub regions may involve first dividing the first image into a first group of sub regions that do not overlap and then dividing the first image into a second group of sub regions wherein each of the second group of sub regions cover at least one border between at least two different sub regions of the first group. In other cases, dividing the first image into uniform overlapping sub regions may involve dividing the first image into a single group of sub regions that each cover at least a border between at least two other sub regions. In various cases, the methodology used to divide the first and/or second image into uniform overlapping sub regions may be determined automatically, in response to one or more user inputs received via the input/output component 104, and/or otherwise determined.

As discussed above, the overlapping sub regions of the first and/or second images may all have uniform dimensions. In some cases, uniform dimensions may be equal height and length. In some cases, each of the sub regions of the first and/or second images may overlap at least portions of multiple other sub regions, such as at least four other sub regions. In various cases, each of the sub regions of the first and/or second images may overlap at least a certain percentage of at least one other sub region, such as, at least ten percent. The minimum border overlap may, for example, be determined based on the estimated motion between two image frames taken over a period of time, or local geometry disparity between images taken with two cameras.

In various implementations, comparison of the uniform overlapping sub regions in the first and second images may include analysis of features included in the first and/or second images. In some cases, one or more groups of features in the first and/or second images may be determined and analyzed to determine which features are features of interest. In such cases, the features of interest may then be analyzed (such as for tracking features between the first and second image, mathematically modeling utilizing dimensions and/or distances computed by comparing the features in the first and second images, and so on).

For example, one or more images of a patient's body surface, for example, scalp may be analyzed to identify one or more blobs. Blobs may include any object or feature of the patient's scalp such as follicular units, scars, moles, and/or any other such feature. Subsequently, the identified blobs may be analyzed to determine which blobs are follicular units. The blobs identified as follicular units may be determined to be the features of interest whereas blobs not identified as follicular units may remain classified as blobs. Blobs that remain classified as blobs may be excluded from further analysis in some cases.

Because features of interest, such as hairs, may be located close to the border between sub regions and many different hairs may look alike and closely located, therefore incorrect subdivision may cause a mismatch and incorrect tracking or pairing of the features of interest. To address this problem, in one or more implementations, comparison of the overlapping sub regions in the first and second images may include classifying sub regions of the first image as primary or secondary for each of one or more features (such as a follicular unit in an image of a patient's scalp) included in the first image. In some cases, a sub region may be the primary sub region for a respective feature when the respective feature is closer to a center of the sub region than the center of any other sub region of the first image. Further, a sub region may be classified as secondary when the respective sub region is not the primary sub region for a particular feature (i.e., the respective feature is not closer to a center of the sub region classified as secondary than the center of any other sub region of the first image) but the feature is still located in that respective sub region. Some portion of sub regions where the particular feature is located that are classified as secondary overlap the primary sub region. Overlapping of sub regions may enable better location of where features of interest might be found in the second image as the features of interest might not always be located in region corresponding to the primary sub region in the second image. Data regarding features, primary sub regions for respective features, and/or sub regions classified as secondary for respective features may be stored (such as in the storage medium 103).

Subsequently, a feature may be selected and a sub region of the second image may be searched for the selected feature. In some implementations, the first sub region of the second image to be searched for the selected feature may be the primary sub region of the second image that corresponds to the primary sub region of the first image. However, if the selected feature is not found in this primary sub region of the second image, sub regions of the second image corresponding to sub regions of the first image classified as secondary may then be searched.

In various implementations, comparison of the overlapping sub regions in the first and second images may be performed in order to track positional differences between one or more features in the first and second image, pair one or more features with corresponding feature(s) in the second image in order to determine at least one connection between the first and second image, and/or for other such purposes. In cases where a feature in the first image is paired with a corresponding feature in the second image, the feature may be paired when the difference between a location of the feature in the first image is within one or more dimensional constraints of a location of the corresponding feature in the second image. For example, the first image and the second image may be two-dimensional images and a feature in the first image may be paired with a corresponding feature in the second image when the location in the first image is within a predetermined number of pixels horizontally and vertically of the location of the corresponding feature in the second image. The predetermined number of pixels depends on the geometry disparity of the two images. Along the shared axis, the pixel number may be for example in the range of 5 to 10 pixels, while in the other dimensions the pixel number may be for example between 5 and 50 pixel based on the pixel resolution and motion vectors. One example of a method of "pairing" can be found in commonly owned U.S. Patent Publication No. US2010/0080415, which is hereby incorporated by reference.

In some cases, comparison between features of the first and second images may be less accurate for one or more dimensions than others. As such, one or more dimensions may have a 'looser' dimensional constraint than other dimensions for purposes of pairing. For example, in cases where the first and second images are images of the same scene captured by left and right cameras, comparison between features of the first and second images may be less accurate for a horizontal dimension (or 'x' dimension) than for a vertical dimension (or 'y' dimension). As such, a feature in the first image may be paired with a corresponding feature in the second image when the location in the first image is within 5 to 50 pixels horizontally and five pixels vertically of the location of the corresponding feature in the second image. This looser horizontal constraint may be necessary in order to compensate for positional differences between the left and right cameras when pairing features in the first and second images.

However, this looser dimensional constraint may result in more false positives (pairings between features in the first and second images that do not truly correspond) than would result if a 'stricter' constraint was used. In order to reduce such false positives, an average shift may be calculated for the sub regions of a previously processed pair of images. In some cases, the average shift for a sub region may be an average of the difference between the distance of each feature of the sub region in the first previously processed image and the second previously processed image. This average shift for a sub region may be stored (such as in the storage medium 103) and/or used with one or more dimensional constraints so that the dimensional constraint used may be stricter.

For example, an average horizontal dimension shift of two pixels may be calculated for a sub region of a previously processed pair of images. Subsequently, a feature in a sub region of the first image may be paired with a corresponding feature in a corresponding sub region of the second image when the location in sub region of the first image is within five pixels plus the two pixel average horizontal dimension shift horizontally and five pixels vertically of the location of the corresponding feature in the second image. Thus, as the feature will be paired if it is within seven pixels horizontally and five pixels vertically, the horizontal constraint is tighter than if a ten pixel horizontal constraint was used and fewer false positives may result.

Although the above describes pairing of features based on dimensional constraints in two-dimensions, and a single average dimension shift used to allow a tighter constraint for a single dimension, it is understood that this is for the purposes of example. In various cases, the first and second images may have any number of dimensions and the average dimensional shift for each sub region may be calculated and used for any number of dimensions without departing from the scope of the present disclosure. For example, the average location difference of all features of interest within the same sub region in the first and second images are calculated and stored as the disparity for this sub region.

Figure 3A:
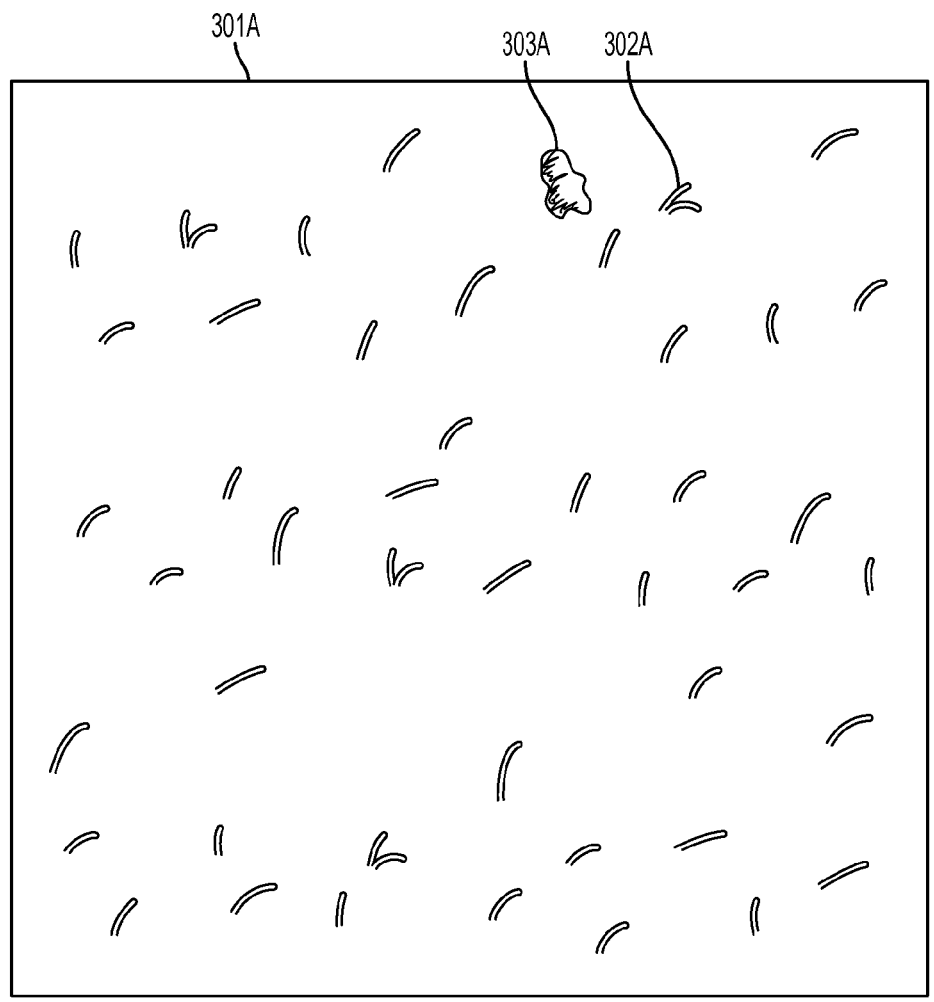
FIGS. 3A through 3E illustrate division of a first image and a second image into overlapping sub regions.
Figure 3B:
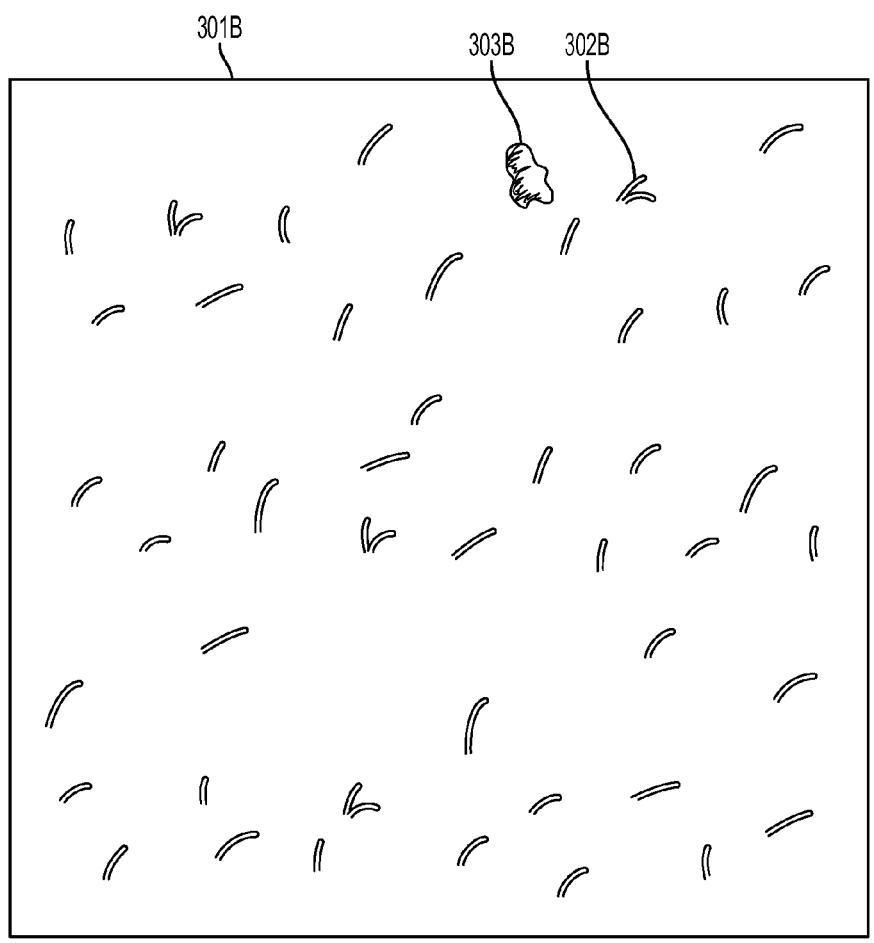

FIGS. 3A through 3E illustrate an example division of a first image 301A and a second image 301B into uniform overlapping sub regions. As can be seen in FIGS. 3A and 3B, the images 301A and 301B may be images of a same view of a patient's body surface captured by two different cameras. As can also be seen in FIGS. 3A and 3B, the image 301A includes blobs 302A and 303A (being follicular unit 302A and mole 303A) and the image 301B includes blobs 302B and 303B (being follicular unit 302B and mole 303B). At this stage, it is not known with certainty whether or not the follicular unit 302A in the image 301A is the same follicular unit as the follicular unit 302B in the image 301B, or whether or not the mole 303A 302A in the image 301A is the same mole as the mole 303B.

Figure 3C:
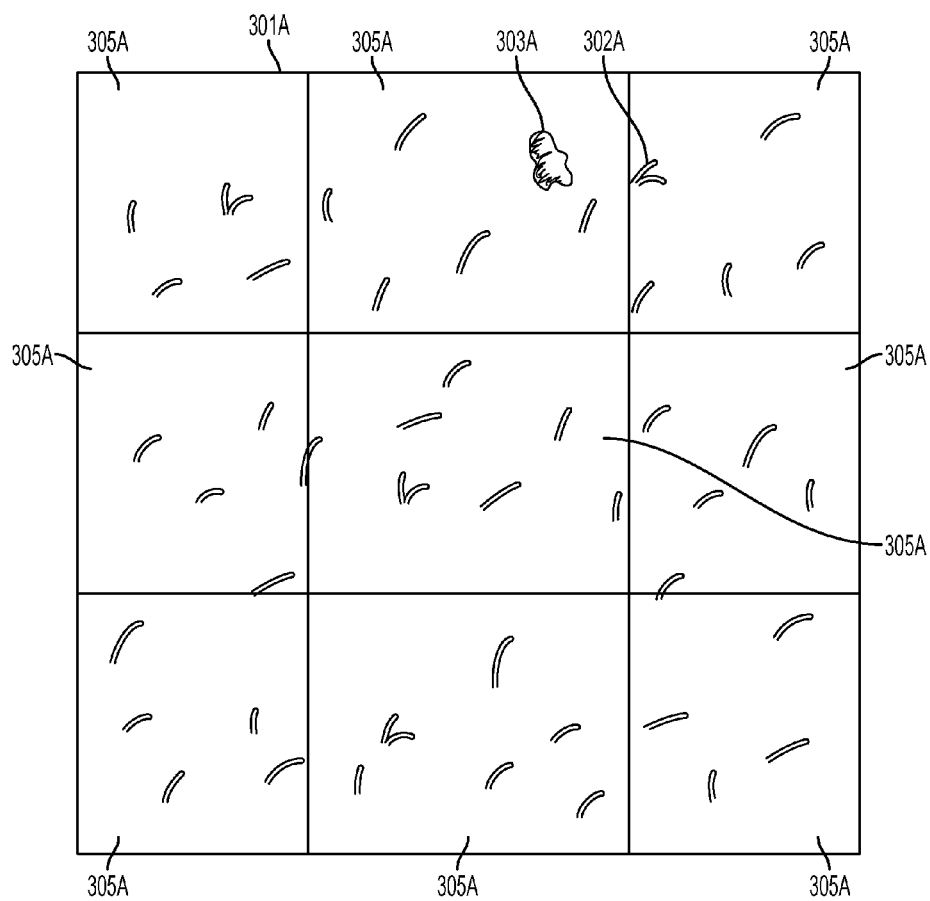
Figure 3D:
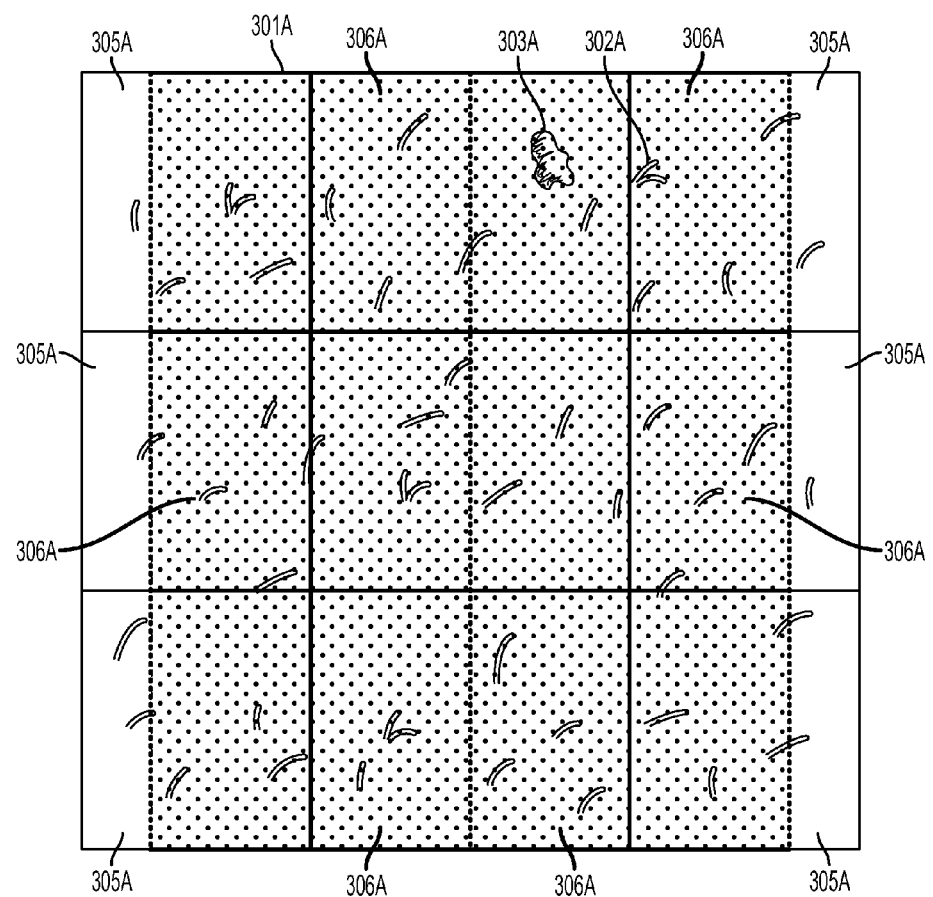
Figure 3E:
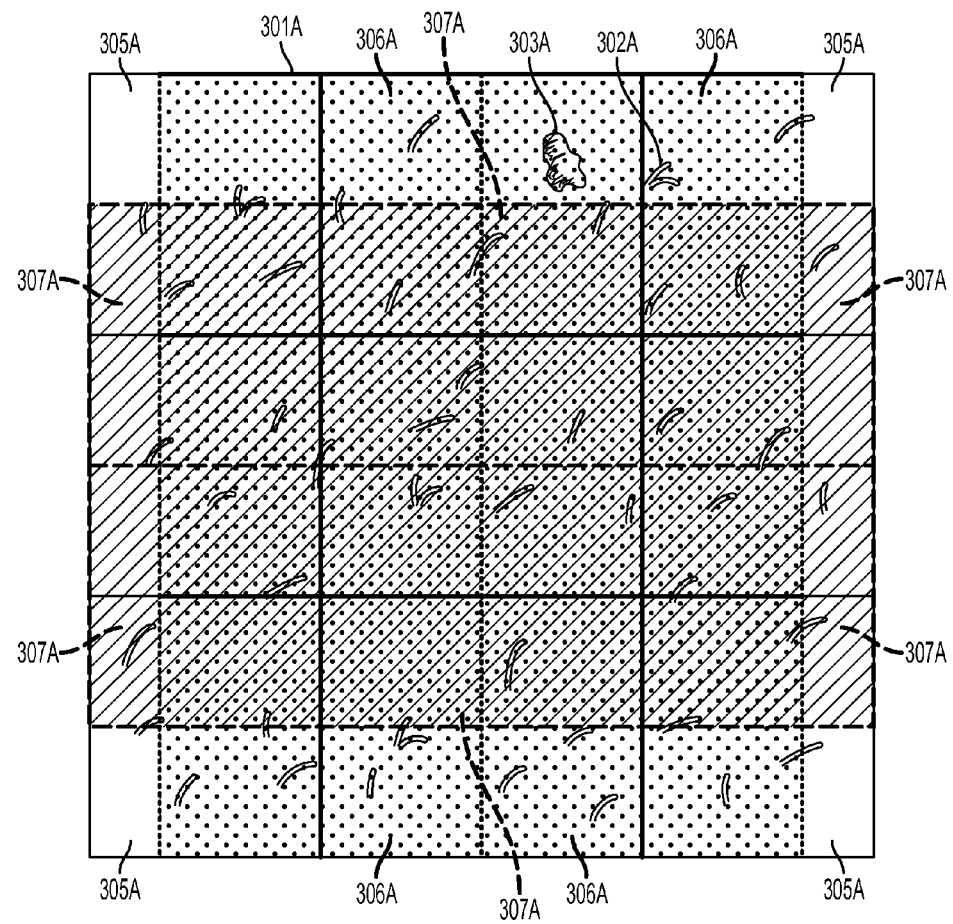

FIG. 3C illustrates division of the image 301A into a first group of uniform sub regions 305A that do not overlap. FIG. 3D illustrates the further division of the image 301A of FIG. 3C further into a second group of uniform sub regions 306A. It should be noted that the second group of sub regions 306A cover boundaries between sub regions of the first group of sub regions 305A. FIG. 3E illustrates the yet further division of the image 301A of FIG. 3D further into a third group of uniform sub regions 307A. It should be noted that the third group of sub regions 307A cover one or more boundaries between one or more of the first group of sub regions 305A and one or more boundaries between sub regions of the second group of sub regions 306A.

Thus, as can be seen in FIG. 3E, the image 301A has been divided into multiple uniform overlapping sub regions (i.e., the first group 305A, the second group 306A, and the third group 307A). Although FIGS. 3A and 3C-3E and the above illustrate and describe division of the image 301A into multiple uniform overlapping sub regions, it is understood that the image 301B may be similarly divided.

Further, although FIGS. 3A and 3C-3E and the above illustrate and describe division of the image 301A into multiple uniform overlapping sub regions according to a particular methodology, it is understood that this is for the purposes of example. In various implementations, images may be divided into uniform overlapping sub regions according to any number of different division methodologies. In some cases, the particular methodology utilized to divide the images may be selected in response to one or more user inputs (such as user inputs received via the input/output component 104).

Additionally, though FIGS. 3A through 3E illustrate division of a same view of a patient's body surface captured by two different cameras into uniform overlapping sub regions, it is understood that this is for the purposes of example. In various implementations, the first image and second image may be any kind of images and the present disclosure is not intended to be limited to images of the same view of a patient's scalp or body surface in that respect. For example, as indicated earlier, the images may be images taken of a view of a patient's scalp by a same camera over time (i.e., the images are different frames of a time-based sequence of frames).

Figure 4:
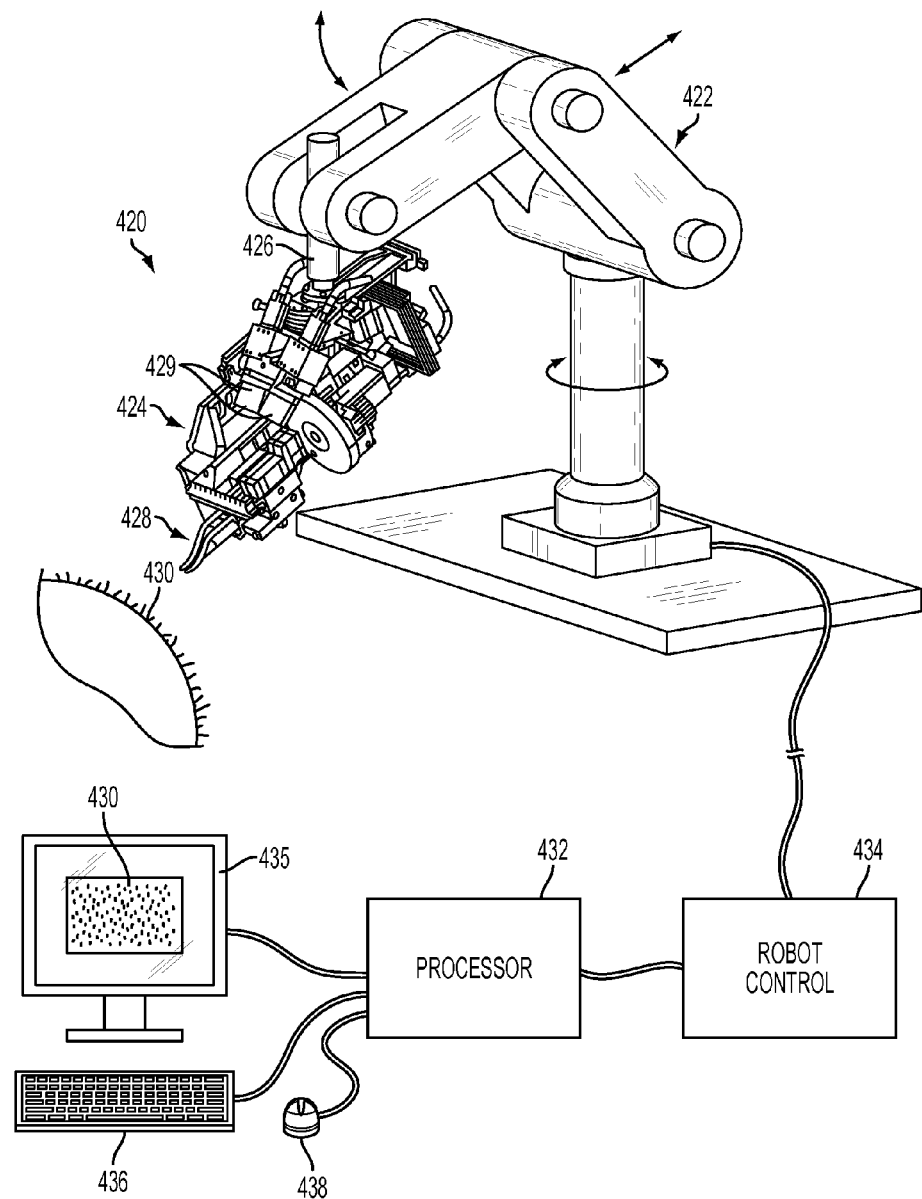
FIG. 4 a schematic perspective view of one example of a robotic system that may be implemented with the methodology of one or more of the disclosures described herein, such as the methods of FIG. 2 and/or FIG. 5.

As discussed above, the method 200 of FIG. 2 may be performed as part of processing first and second images containing follicular units, and implemented in the automated hair harvesting or hair transplanting procedures to help positioning and orienting one or more tools for transplanting one or more follicular units. FIG. 4 is a schematic perspective view of one example of a robotic system 420 that may be implemented with the methodology of the disclosure described herein, such as the method 200 of FIG. 2.

The system 420 includes a robotic arm 422 and an assembly 424 mounted, for example, for rotation on a down tube 426 of the robotic arm. Various arrows are shown to illustrate the movement capabilities of the system 420. Various motors and other movement devices may be incorporated in the assembly 424 to enable fine movements of an operating tip of a tool 428 in multiple directions. The exemplary robotic system 420 further includes at least one imaging acquisition or imaging device 429, which is described in more detail below. The imaging device may be mounted in a fixed position, or it may be coupled (directly or indirectly) to a robotic arm or other controllable motion device. The operating tip of the tool 428 is shown positioned over a body surface 430, in this case a part of the patient scalp having hair follicles thereon. The tool 428 is any number of the harvesting and/or implanting tools useful for, respectively, removing and/or implanting follicular units from and into the body surface 430. In some embodiments, the harvesting and the implanting tool may be combined in one tool, in other embodiments, these tools may be separate tools.

A processor 432 of FIG. 4 may be an image processor for processing images obtained from the image acquisition device 429. The processor 432 may also instruct the various movement devices of the robotic arm 422 and the assembly 424, including the harvesting/implanting tool, and act, for example, through a robotic control 434 as schematically shown in FIG. 4. The robotic control 434 may be operatively coupled to the robotic arm and configured to control the motion of the robotic arm, including the motion based on the images or data acquired by the image acquisition device. Alternatively, robotic control 434 may be incorporated as a part of the processor 432, so that all processing and controls of all movements of all the tools, including harvesting tools, the robotic arm and any other moveable pails of the assembly, including those based on the images or data acquired by the image acquisition device, are concentrated in one place. The system 420 may further include a monitor 435, keyboard 436, and a mouse 438. The system further includes an interface adapted to receive an image data, various parts of the system allow an operator to monitor conditions and provide instructions, as needed. A magnified image of the body surface 430 can be seen on the monitor 435. In addition, the system may include other tools, devices and components useful in harvesting, and/or implantation of the FU, or in hair treatment planning.

Some non-limiting examples of an imaging device 429 shown in FIG. 4 include one or more cameras, such as any commercially available cameras. The image acquisition device may take still images, or it could be a video recording device (such as a camcorder) or any other image acquisition device or sensor. While stereo or multi-view imaging devices are very useful in the systems and methods described herein, it is not necessary to employ such geometries or configurations, and the concepts described herein are not so limited. Likewise, although it is preferred that the image acquisition device be a digital device, it is not necessary. For example, the image acquisition device could be an analog TV camera that acquires an initial image which is then processed into a digital image (for example, via an analog-to-digital device like a commercial-off-the-shelf frame grabber) for further use in the methods of the invention. The image acquisition device may be coupled to a processing system, shown incorporated in the processor 432 in FIG. 4, to control the imaging operation and process image data.

The image processor, which sometimes may be referred to as a processor, may be any suitable device programmed and configured to perform the methods described herein. It may incorporate a single or multiple processors to control various subsystems and provide the user interface. For example, the image processor may be programmed with software configured to perform the methods of the invention as further described in more detail. By way of example, and not limitation, a suitable image processor may be a digital processing system which includes one or more processors or other type of device. An image processor may be a controller or any type of one or more personal computers ("PC"). Alternatively, the image processor may be an Application Specific Integrated Circuit (ASIC) or Field Programmable Gate Array (FPGA). The image processor may also include memory, storage devices, and other components generally known in the art and, therefore, they do not need to be described in detail here.

According to another aspect of the present application, the system and method are provided for automatically or dynamically controlling (e.g. adjusting or resizing) of the region of the image to be processed based on the information in the image and the timing requirements, or to fit a timing requirement for processing based on the information in the image. The timing requirements may, for example, be dictated by the system and/or the software, taking into consideration, for example, the type of the procedure to be performed and relevant computation time. In reference to a robotic image-guided hair transplantation method and system, the timing requirements may take into account at least the imaging device and the robot's movement requirement. In addition, it may also take into account the image processing time and other such computations. The methods of the present disclosure boost system performance from lower frequency to higher frequency. Returning to FIG. 1, in reference to this methodology, the processing unit 102 of the computing device 101 may choose a processing window, the processing window corresponding to a portion of an image to be processed. The portion may be expressed as a percentage of the whole image. Alternatively, the user may choose a portion of an image to be processed or at least provide an input for choosing such portion, and the processing unit 102 of the computing device 101 may choose a processing window, the processing window corresponding to the portion of an image to be processed. In yet another alternative, the processing window may be chosen by default. The processing unit may estimate the amount of time required to process a percentage of an image of the body surface, and provide a processing window dimensioned to correspond to that portion of the image. The dimensions of the processing window may be determined by a look-up table which may comprise data relating to dimensions of previous processing windows, image portions, and/or time constraints such as computation time. No matter how chosen, the processing window comprises dimensions. The processing unit 102 may estimate an amount of time required to process the processing window. The estimated amount of time may be compared to a time constraint (such as 20 milliseconds, for example). The dimensions of the processing window may be adjusted if the estimated amount of time is less than or greater than a time constraint. For example, if the estimated amount of time is less than the time constraint, the dimensions of the processing window may be increased. If the estimated amount of time is greater than the time constraint, the dimensions of the processing window may be decreased. The adjusted portion of the image corresponding to the adjusted dimensions of the processing window may then be processed. In this way, the processing of the image may be adjusted to process as much of the image as is possible within the time constraint.

Although the above describes adjusting the dimensions of the processing window when the estimated amount of time is less than or greater than the time constraint, the estimated amount of time may equal the time constraint. In such cases, adjustment of the dimensions of the processing window may be omitted and the portion of the image corresponding to the selected dimensions of the processing window may be processed without adjustment.

Further, in some cases, the dimensions of the processing window may not be adjusted anytime that the estimated time amount is greater or less than the time constraint. For example, in some cases the dimensions of the processing window may be greater or less than a time constraint by a certain threshold (such as 3 milliseconds) before the dimensions of the processing window are adjusted. In this way, the time savings (in the case of decreased dimensions) and/or the increased processed percentage (in the case of increased dimensions) may be weighed against the time and/or processing required to adjust the dimensions of the processing window.

By way of example, as described above, processing of an image a patient's body surface may be performed as part of an automated process for positioning and/or orienting one or more tools for transplanting follicular units. In such a case, a processing window may be set to correspond to a portion of the image of the patient's body surface. An estimated amount of time for processing the portion of the image corresponding to the processing window as part of the automated process for orienting one or more tools for transplanting follicular units may be determined. Such estimated amount of time may be affected, for example, by the level of baldness (the actual amount of the hair in the relevant portion of the image), or the density of the hair in the relevant portion of the image, or by other similar factors. The size of the processing window may be adjusted if the estimated amount of time is less than or greater than a time constraint. If the estimated amount of time equals the time constraint, the size of the processing window may not need to be adjusted. However, if the estimated amount of time is less than the time constraint, the size of the processing window may be increased. Further, if the estimated amount of time is greater than the time constraint, the size of the processing window may be decreased. For example, if a portion of the image to be processed has a large number of hair grafts to be processed that may require substantial time, then the size of such portion of the image may be reduced. On the other hand, if a particular portion of the image contains mostly bald areas or areas with a smaller number of the features to be processed, then such portion of the image may be increased without negatively affecting the processing time. The portion of the image corresponding to the processing window may then be processed as part of the automated process for positioning and/or operating one or more tools, such as tools for transplanting follicular units.

FIG. 5 illustrates a method 500 according to the present disclosure. The method 500 may be performed by the computing device 101 of FIG. 1. The flow begins at block 501 and proceeds to block 502 where a processing window corresponding to a portion of an image and having certain dimensions is chosen. The processing unit 102 estimates in block 503 an amount of time required to process the processing window. The flow then proceeds to block 504 where the processing unit determines whether or not the estimated amount of time is greater or less than a time constraint (i.e., the dimensions of the processing window may be adjusted if the estimated amount of time is greater or less than the time constraint).

If the processing unit determines that the estimated amount of time is greater than the time constraint, the flow may proceed to block 506 where the processing unit 102 decreases the dimensions of the processing window. The flow may then proceed to block 505 where the processing unit processes the adjusted portion of the image corresponding to the adjusted (in this case, decreased) dimensions of the processing window.

However, if the processing unit 102 determines that the estimated amount of time is less than the time constraint, the flow may proceed to block 507 where the processing unit increases the dimensions of the processing window. The flow may then proceed to block 505 where the processing unit processes the adjusted portion of the image corresponding to the adjusted dimensions (in this case, increased) of the processing window.

However, if the processing unit 102 determines that the estimated amount of time is neither less than or greater than the time constraint (i.e., is equal to the time constraint), the flow may proceed directly to block 505 where the processing unit processes the portion of the image corresponding to the dimensions of the processing window.

Although the method 500 is illustrated and described as including specific operations performed in a specific order, it is understood that this is for purposes of example. In various implementations, other operations maybe performed in other orders without departing from the scope of the present disclosure. For example, in some implementations, the method 500 may include operations such as the operation of generating one or more reconstructions of one or more scenes captured by at least part of the image based on the processing performed in block 505.

Further, although examples of the methods 200 and 500 are illustrated and described as separate methods performed as separate embodiments, it is understood that this is for the purposes of example. In some implementations, one or more operations of methods 200 and 500 may be combined into a single method.

In one or more implementations, one or more automated and/or computer assisted operations may be performed based on processing the portion of the image. For example, in some implementations, one or more tools for transplanting follicular units may be oriented based on processing the portion of the image.

In various implementations, the image may be part of a sequence of images (such as frames of a video). In such implementations, the estimate for processing a current image may be modified based on a comparison between the estimate for processing a previously processed image and the actual time that was spent processing that previously processed image. For example, if the estimate for processing the previous image exceeded the actual time spent, the estimate for processing the current image may be decreased. By way of another example, if the estimate for processing the previous image was less than the actual time spent, the estimate for processing the current image may be increased.

In some implementations, estimating the amount of time required to process a percentage of an image may include generating one or more models (such as one or more mathematical models). This model may then be executed to determine the estimated amount of time. When the image in such implementations is part of a series of images, an amount of time estimated for processing a previous image may be compared to the time actually spent processing the previous image in order to update the model in order to improve the accuracy of the model.

In some cases, decreasing the portion of the image that will be processed may not be enough to make the estimated amount of time equal the time constraint. For example, the image may be a frame of video that has a frame rate of 30 frames per second and the estimated time amount for processing even 1% of the image may be more than the time between when the image is received and when the next image will be received (which may be the time constraint). As such, the processing unit 102 may transmit one or more instructions to the source of the image (which may be one or more imaging device, such as one or more cameras, video cameras, camcorders, and so on) to reduce the frame rate at which the video is captured (for example, to 10 frames per second). As the frame rate is thusly reduced, the time constraint may be increased and various portions of the image may be able to be processed within the increased time constraint.

In various cases, increasing the portion of the image that will be processed may not be enough to make the estimated amount of time equal the time constraint. For example, the image may be a frame of video that has a frame rate of 15 frames per second and the estimated time amount for processing even the entirety of the image may be less than the time between when the image is received and when the next image will be received (which may be the time constraint). As such, the processing unit 102 may transmit one or more instructions to the source of the image (which may be one or more imaging devices, such as one or more cameras, video cameras, camcorders, and so on) to increase the frame rate at which the video is captured (for example, to 40 frames per second). As the frame rate is thusly increased, the time constraint may be reduced and though a lower percentage of the image may be able to be processed within the reduced time constraint, the information obtainable related to one or more scenes captured in the image may be more current, less subject to lag, and so on.

Although the above describes the processing unit 102 transmitting instructions to an image source to increase and/or decrease the rate at which images are captured based on how much percentage or what portion of the image can be processed within the time constraint, it is understood that this is for the purposes of example. In various cases, other information may be taken into account when determining to transmit the instruction and/or the instructions may be transmitted when the estimated time amount for any percentage does not exceed the time constraint and/or when the estimated time amount for all of the image is not less than the time constraint.

For example, in some cases, the processing unit 102 may monitor and/or store data regarding a number of frames of video that are dropped or lost. In such cases, the number of frames that have been dropped or lost may be a factor that is considered along with the estimated time amount for various percentages of the image and the time constraint in determining whether or not to transmit instructions to alter a current frame rate.

Figure 6A:
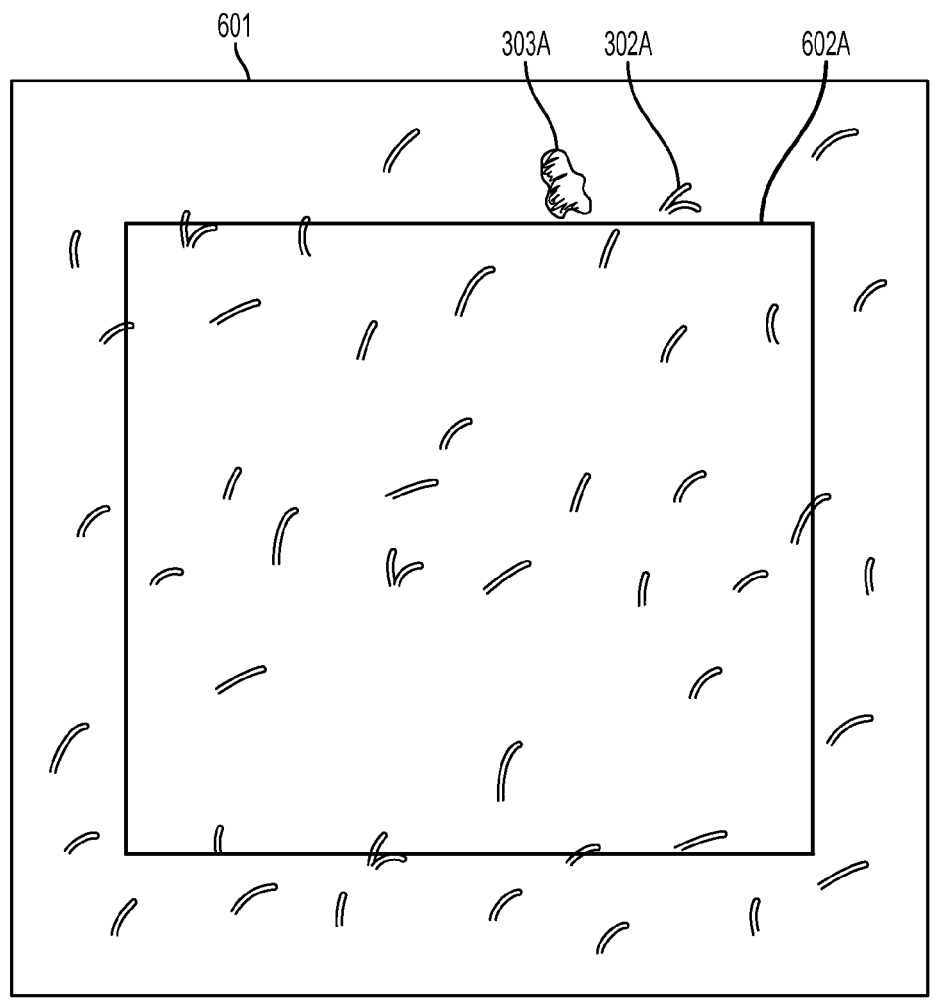
FIG. 6A illustrates an image of a patient's body surface and a corresponding processing window.

FIG. 6A illustrates an image 601 of a patient's body surface. As can also be seen in FIG. 6A, a processing window 602A has been set to correspond to a portion of the image. An estimated amount of time for processing the portion of the image corresponding to the processing window may be determined. The size of the processing window 602A may then be adjusted if the estimated amount of time is greater or less than a time constraint. If the estimated amount of time equals the time constraint, the processing window 602A may not be adjusted. However, if the estimated amount of time is less than the time constraint, the size of the processing window may be increased (as is illustrated by the processing window 602B of FIG. 6B). Further, if the estimated amount of time is greater than the time constraint, the size of the processing window may be decreased (as is illustrated by the processing window 602C of FIG. 6C).

Figure 6B:
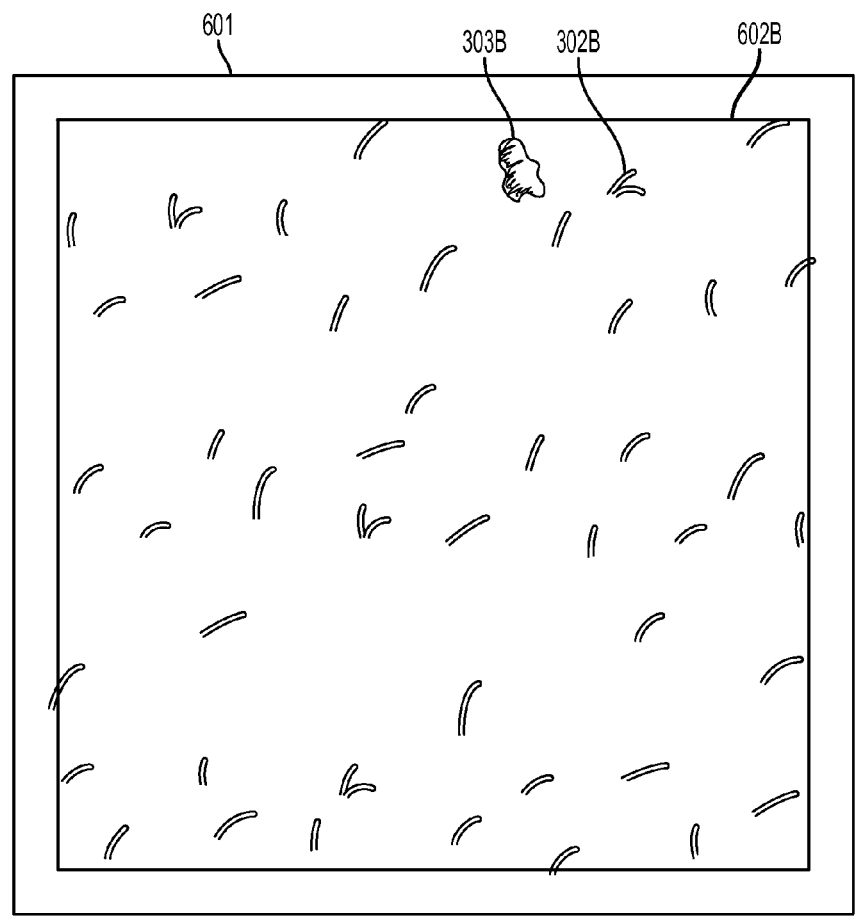
FIG. 6B illustrates the image of the patient's body surface of FIG. 6A after the processing window has been increased.
Figure 6C:
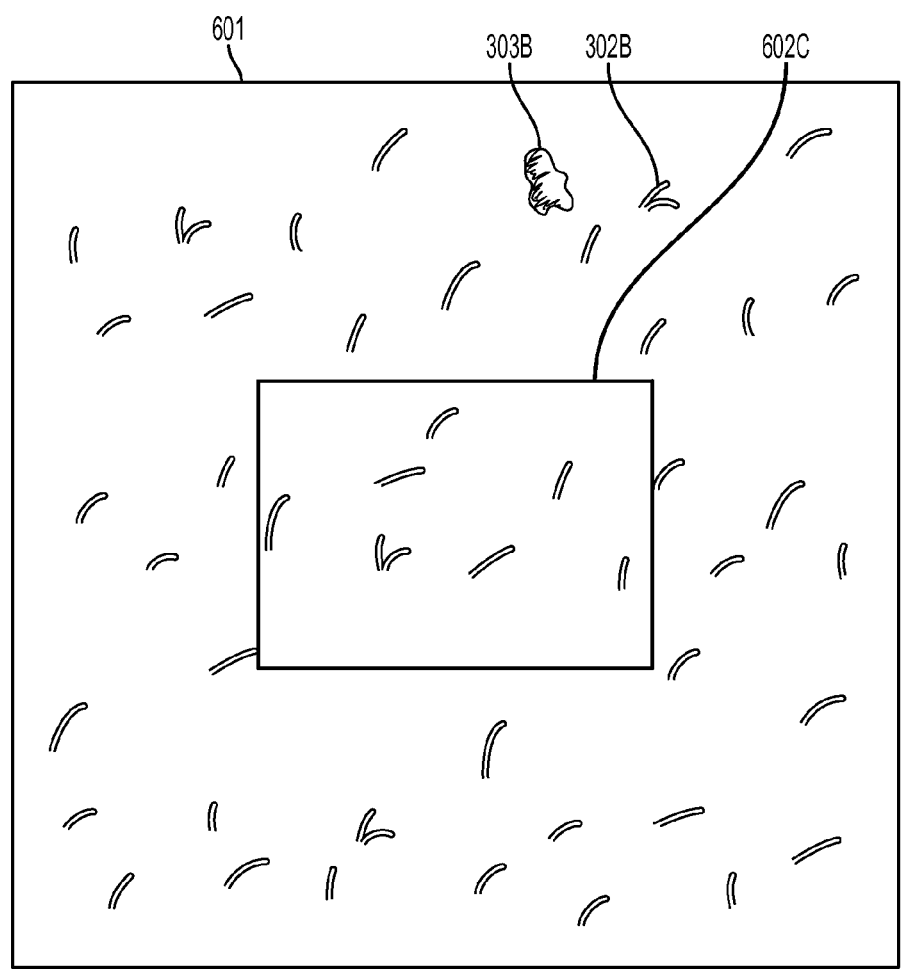
FIG. 6C illustrates the image of the patient's body surface of FIG. 6A after the processing window has been decreased.

In some implementations, the processing window may be centered with respect to the image (such as in FIGS. 6A-6C). In such implementations, increasing and/or decreasing the dimensions of the processing window may be performed such that the adjusted processing window remains centered with respect to the image (such as in FIGS. 6A-6C).

Figure 6D:
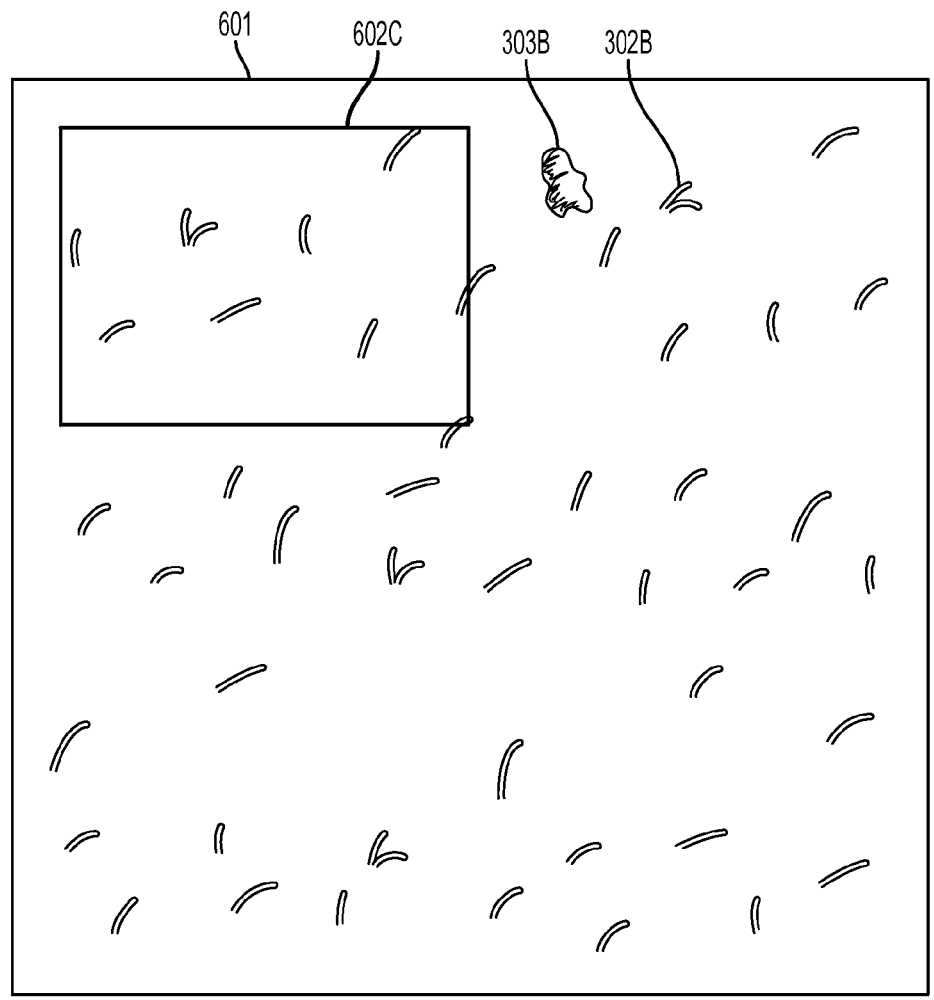
FIG. 6D illustrates the image of the patient's body surface of FIG. 6C after the processing window has been shifted.

However, in other implementations the processing window may not be centered with respect to the image and/or may not be centered with respect to the image after adjustment of the processing window. For example, as described above, the processing of the image may be performed as part of an automated process for orienting one or more tools for transplanting follicular units. In such cases, when a follicular unit in a particular region of a previously processed image has been processed, the automation procedure may select an un-processed region of the image (such as one or more of the corners of the image) for subsequent processing. If the un-processed region of the image that is subsequently processed is still the center, fewer un-harvested follicular units may be available for selection in the area in which the tool is positioned. However, in order to optimize the processing procedure, it is desirable to process as many follicular units in the processing window as possible at any time. As such, when the tool is positioned relative to a different portion of the image based on processing (such as processing of the portion of the image 601 corresponding to the processing window 602C of FIG. 6C), the processing window for processing subsequent images may be set to have a different position (such as is illustrated in FIG. 6D), not necessarily in the center. In this manner, the processing window is able to optimize the number of un-harvested follicular units to be processed.

As discussed above, one or more reconstructions of one or more scenes in the image may be generated based on the processing of the portion of the image and shifting a processing region. Such reconstructions may be two-dimensional reconstructions, three-dimensional reconstructions, and so on. Some implementations may reconstruct one or more scenes captured by at least part of the image based on the processing of a portion of the image (such as the portion of the image 601 corresponding to the processing window 602A in FIG. 6E) and one or more selected regions of the image (such as the regions 603 in FIG. 6E). In this way, reconstruction of the one or more scenes may be less biased by actions taken with respect to the portion of the image.

In various implementations, the selected regions may be selected based on various criteria. For example, in some cases the selected regions may be selected based on including a greater density of features and/or features of interest than other regions of the image. For example, the regions of 603 of FIG. 6E may include a greater density of follicular units 302B than other portions of the image 601. However, in other cases, the selection of the selected regions may be based on other criteria, may be automatically selected, may be randomly selected, and/or may be otherwise selected.

Figure 6E:
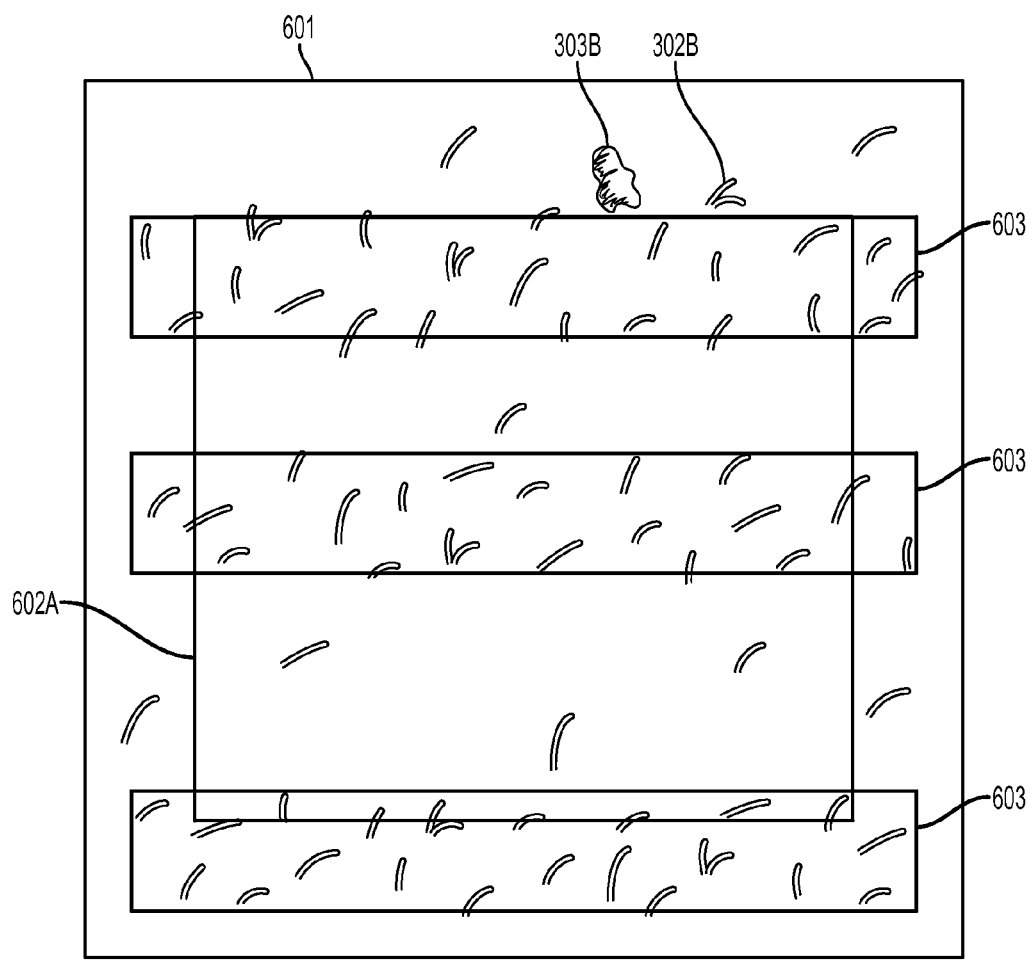
FIG. 6E illustrates the image of the patient's body surface of FIG. 6A along with a number of selected regions.

Although FIG. 6E illustrates the selected regions 603 partially within the processing window 602A and partially outside the processing window, it is understood that this is for the purposes of example. In some cases, the selected regions may be entirely outside the processing window, entirely within the processing window, or partially within the processing window and partially outside the processing window without departing from the scope of the present disclosure. Further the relationship of the selected regions to the processing window may change based on alteration of the processing window.

Further, although FIGS. 6A through 6E illustrate images of a patient's body surface, such as scalp, it is understood that this is for the purposes of example. In various implementations, the image may be any kind of image and the present disclosure is not intended to be limited to images of a patient's scalp.

As discussed above, the method 500 of FIG. 5 may be performed as part of processing at least a portion of an image for the purposes of positioning and/or operating one or more tools, for example, for transplanting one or more follicular units. In some implementations the methodology discussed herein maybe performed by a system such as the system 420 discussed above and illustrated in FIG. 4.

As also discussed above, in various implementations estimating the amount of time required to process a portion of an image may include generating one or more models (such as one or more mathematical models). For example, FIG. 7A illustrates a formula that represents the processing time for a portion of an image as a polynomial of the ratio of a processing window to the image itself. In the formula $t_i$ may represent the time for processing a particular image in a sequence which may be propagated with the ith power of the ratio of the processing input. N may be the maximum effective factors in the polynomial. For two-dimensional processing, N may be 4. For three-dimensional modeling, N may be as high as 9. Each time for processing a series of images may be measured by the processing unit 102. The processing unit may estimate the coefficients $a_i$ such that the ratio may be adjusted to meet the desired specific timing (i.e. the estimated time amount equals the time constraint).

FIG. 7B illustrates an example of a first formula for approximating the coefficients for building and/or updating the model illustrated in FIG. 7A. The formula illustrated in FIG. 7B represents an average coefficients approach. The formula illustrated in FIG. 7B may be used for estimating $a_i$. The final result may be from the averaged coefficients. However, the formula illustrated in FIG. 7B may require that the ith power for processing each image in the sequence is known.

FIG. 7C illustrates an example of a second formula for approximating the coefficients for building and/or updating the model illustrated in FIG. 7A. The formula illustrated in FIG. 7C represents a least square fitting approach. This formula may not require knowing the exact power for processing each image in the sequence, but may require the processing unit 102 to process a number of imaged in different ratios for dense sampling. The formula in FIG. 7C may be used to calculate various ratios from a number of images (such as frames of a video) M.

Although FIGS. 7A-7C are illustrated and described above as mathematical models that may be used in estimating the amount of time required to process a portion of an image, it is understood that these formulas are for the purposes of example. The present disclosure is not intended to be limited to one or more of the formulas depicted in FIGS. 7A-7C.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for processing an image of a body surface, the method comprising:
choosing a processing window corresponding to a portion of an image of a body surface;
using a processor to:
estimate an amount of time required to process the processing window;
adjust the dimensions of the processing window if the estimated amount of time is less than or greater than a time constraint; and
process either the portion of the image if no adjustment to the processing window is made or an adjusted portion of the image, the adjusted portion corresponding to the adjusted dimensions of the processing window.

2. The method of claim 1, wherein the image of the body surface comprises a frame of video of the body surface and the estimating step further comprises:
determining a difference between a previous estimation of an amount of time required to process a portion of at least one previous frame of the video of the body surface and an actual amount of time spent processing the portion of the at least one previous frame; and
modifying the estimated amount of time based at least on the determined difference.

3. The method of claim 1, wherein the estimating step further comprises generating at least one model to determine the estimated amount of time required to process the processing window.

4. The method of claim 3, wherein the at least one model comprises at least one of an average coefficients model or a least square fitting model.

5. The method of claim 3, wherein the image of the body surface comprises a frame of a video of the body surface, the method further comprising:
determining a difference between a previous estimation of an amount of time required to process a portion of at least one previous frame of the video of the body surface and an actual amount of time spent processing the portion of the at least one previous frame; and
updating the at least one model based at least on the difference.

6. The method of claim 1, wherein the processing window is centered with respect to the image of the body surface.

7. The method of claim 1, the method further comprising: processing the portion of the image of the body surface to position a tool for transplanting hair on a body surface.

8. The method of claim 1, the method further comprising at least one of:
transmitting at least one first instruction to at least one imaging device to increase a frame rate of the at least one imaging device when the estimated amount of time is less than the time constraint; or
transmitting at least one second instruction to the at least one imaging device to decrease a frame rate of the at least one imaging device when the estimated amount of time is greater than the time constraint.

9. The method of claim 1, wherein the image of the body surface comprises a frame of a video of the body surface, the method further comprising:
transmitting at least one instruction to at least one imaging device to decrease a frame rate of the at least one imaging component when the estimated amount of time is greater than the time constraint and more than a threshold number of previous frames have been lost.

10. The method of claim 1, wherein said adjusting step further comprises:
increasing the dimensions of the processing window when the estimated amount of time is less than a time constraint; and
decreasing the dimensions of the processing window when the estimated amount of time is greater than the time constraint.

11. The method of claim 1, wherein the estimating step estimates the amount of time required to process the portion of the image of the body surface based on a density of features within the portion of the image of the body surface.

12. The method of claim 1, further comprising performing at least one automated procedure on the body surface based at least in part on a result of the processing step.

13. The method of claim 1, the method further comprising generating at least one reconstruction of the portion of the image of the body surface based at least in part on the processing step.

14. The method of claim 13, wherein the generation of the at least one reconstruction is based at least in part on at least one selected region of the image.

15. The method of claim 14, wherein the at least one selected region is selected based at least in part on a density of features within the at least one selected region.

16. The method of claim 15, wherein the features comprise hair follicles.

17. The method of claim 14, wherein at least a portion of the at least one selected region is outside the portion of the image of the body surface corresponding to the dimensions of the processing window.

18. The method of claim 1, wherein the time constraint is dictated by one or more of the following: a type of the procedure to be performed, a computation time, an imaging device, an image processing time, or a movement requirement of a movable arm.

19. A system for processing an image of a body surface, comprising:
at least one non-transitory machine readable medium storing instructions; and
at least one processing unit,
wherein the at least one processing unit executes the instructions stored in the at least one non-transitory machine readable medium to:
choose a processing window corresponding to a portion of an image of a body surface;
estimate an amount of time required to process a the processing window;

adjust the dimensions of the processing window when the estimated amount of time is less than or greater than a time constraint; and process either the portion of the image if no adjustment to the processing window is made or an adjusted portion of the image, the adjusted portion corresponding to the adjusted dimensions of the processing window.

20. The system of claim 19, further comprising an interface adapted to receive image data.

21. A computer program for processing an image of a body surface comprising:
- a first set of instructions, stored in at least one non-transitory machine readable medium, executable by at least one processing unit to choose a processing window corresponding to a portion of an image of a body surface;
- a second set of instructions, stored in the at least one non-transitory machine readable medium, executable by the at least one or a different processing unit to estimate an amount of time required to process the processing window;
- a third set of instructions, stored in the at least one non-transitory machine readable medium, executable by the at least one or a different processing unit to adjust dimensions of the processing window when the estimated amount of time is less than or greater than a time constraint; and
- a fourth set of instructions, stored in the at least one non-transitory machine readable medium, executable by the at least one or a different processing unit to process either the portion of the image if no adjustment to the processing window is made or an adjusted portion of the image of the body surface corresponding to the adjusted dimensions of the processing window.

* * * * *